United States Patent [19]

Aigrain et al.

[11] Patent Number: 4,944,575
[45] Date of Patent: Jul. 31, 1990

[54] ELECTROOPTICAL DISPLAY SCREEN AND A METHOD OF FABRICATION OF SAID SCREEN

[75] Inventors: Pierre Aigrain, Paris; Bruno Mourey, Boulogne-Billancourt; Jean C. Dubois, St. Remy les Chevreuses; Michel Hareng, La Noville; Philippe Robin, Sceaux, all of France

[73] Assignee: Thomson-CSF, Paris, France

[21] Appl. No.: 291,327

[22] Filed: Dec. 28, 1988

Related U.S. Application Data

[63] Continuation of Ser. No. 51,710, May 20, 1987, abandoned.

[30] Foreign Application Priority Data

May 20, 1986 [FR] France .................................. 86 0744

[51] Int. Cl.$^5$ .................................. G02F 1/13
[52] U.S. Cl. .................................. 350/333; 350/334; 350/339 R; 350/350 S; 340/784
[58] Field of Search ............... 350/332, 333, 334, 336, 350/339 R, 340, 341, 350 S; 340/784, 765

[56] References Cited

U.S. PATENT DOCUMENTS

| | | | |
|---|---|---|---|
| 3,725,899 | 4/1973 | Greubel | 350/339 R |
| 3,864,021 | 2/1975 | Katagiri et al. | 350/341 |
| 4,021,798 | 5/1977 | Kojima et al. | 350/339 R |
| 4,040,720 | 8/1977 | York | 350/339 R |
| 4,297,004 | 10/1981 | Nishimura et al. | 350/339 R |
| 4,534,623 | 8/1985 | Araki | 350/333 |
| 4,555,953 | 12/1985 | Dario et al. | 73/862.68 |
| 4,572,615 | 2/1986 | Nickol et al. | 350/339 R |
| 4,630,893 | 12/1986 | Credelle et al. | 350/334 |
| 4,683,183 | 7/1987 | Ono | 350/334 |
| 4,790,631 | 12/1988 | Yamazaki | 350/333 |
| 4,836,655 | 6/1989 | Yamazaki | 350/334 |

FOREIGN PATENT DOCUMENTS 2561423  9/1985  France .
0155795  12/1979  Japan .............................. 350/339 R

OTHER PUBLICATIONS

B. Lechner—"Liquid Crystal Matrix Displays", pp. 1566-1579—Proceedings of the IEEE—vol. 59, No. 11, Nov. 1971.

M. H. Francombe—"Ferroelectric Films and Their Device Applications", pp. 413-433—*Thin Solid Films*—vol. 13; No. 12—Nov. 1972.

*Primary Examiner*—Stanley D. Miller
*Assistant Examiner*—Tai Van Duong
*Attorney, Agent, or Firm*—Oblon, Spivak, McClelland, Maier and Neustadt

[57] ABSTRACT

In a method of construction of an electrooptical display screen and especially a liquid-crystal screen, a control point of an image element is provided with a coupling element of ferroelectric material between an electrode and a control lead.

10 Claims, 5 Drawing Sheets

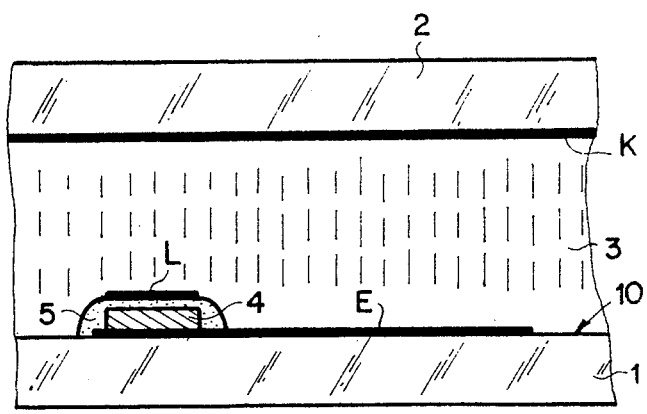
FIG_1
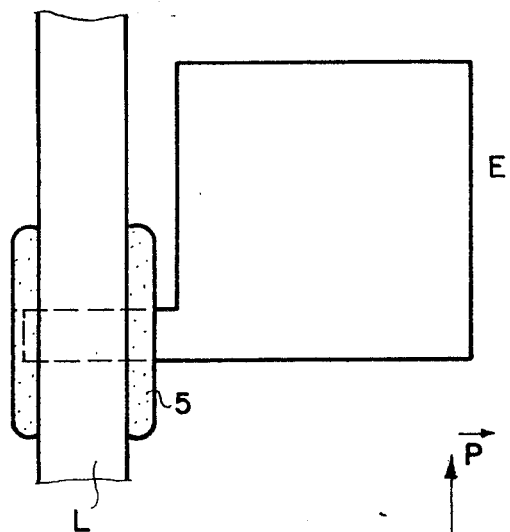
FIG_2
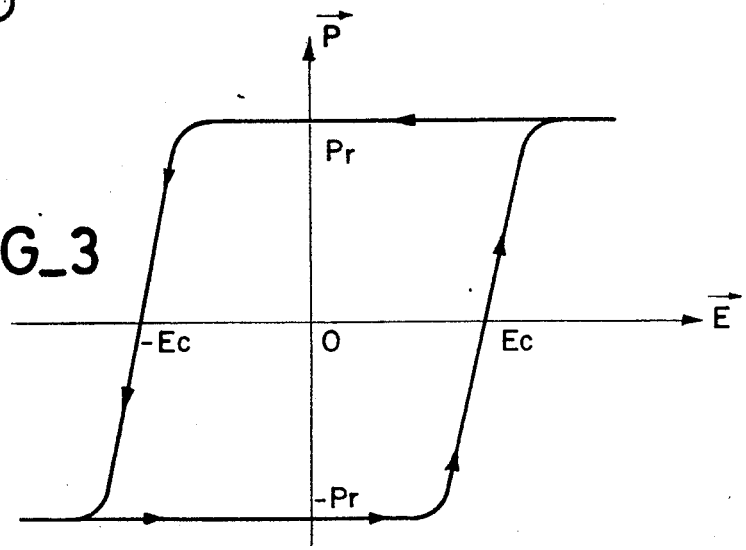
FIG_3

FIG_4
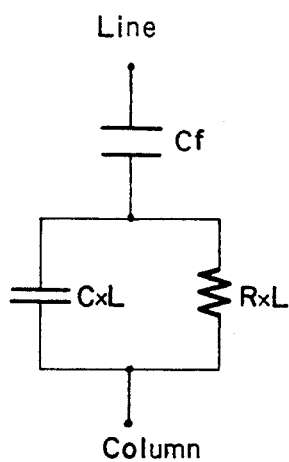
FIG_5
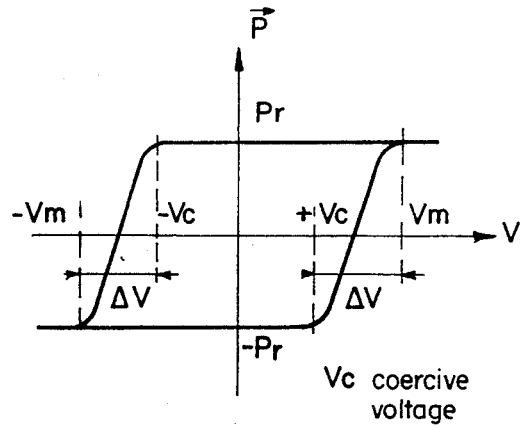
FIG_6     FIG_7
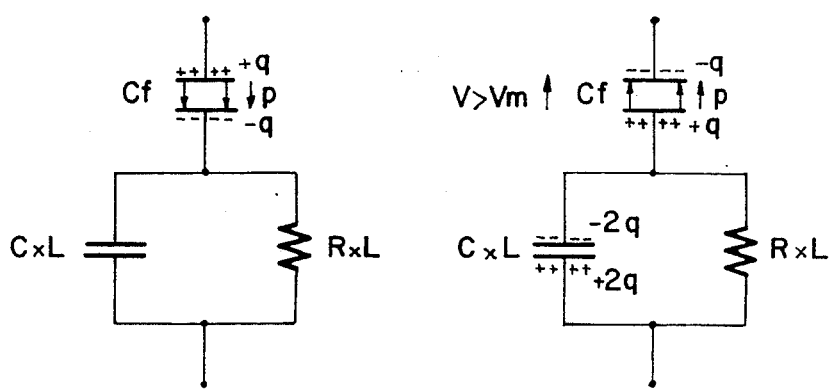
FIG_8
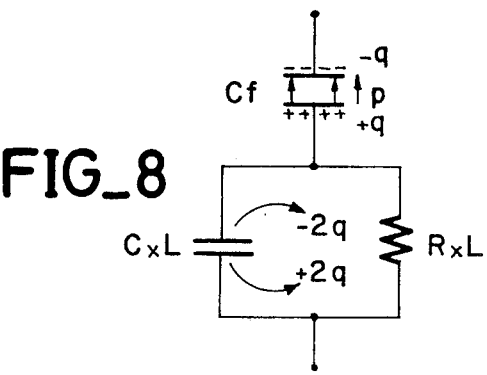

FIG_9
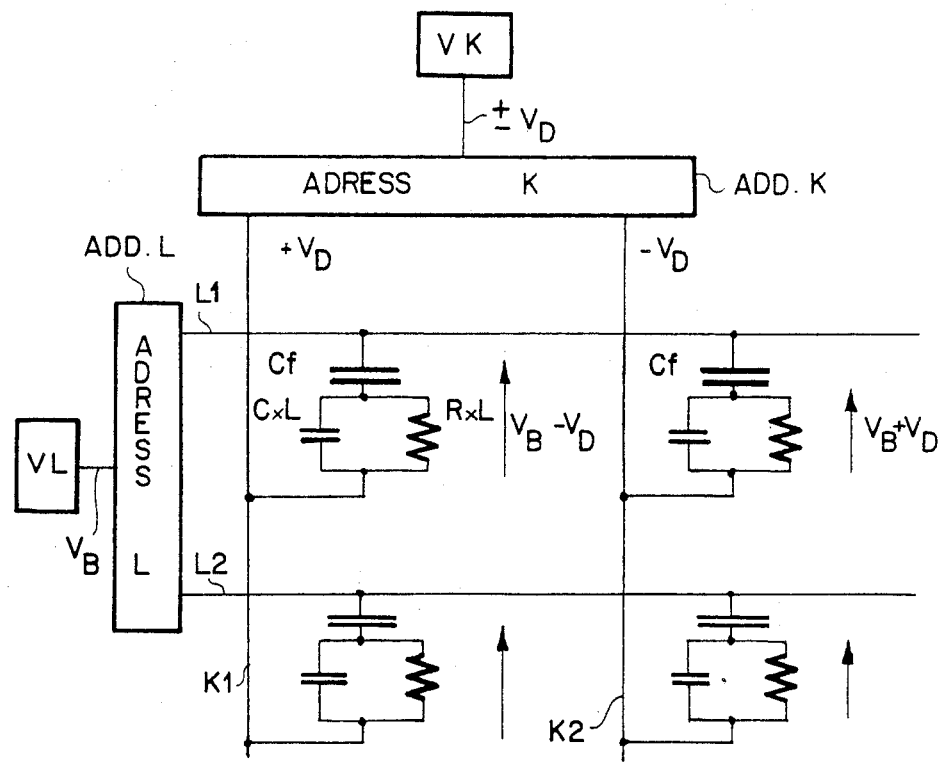
FIG_10
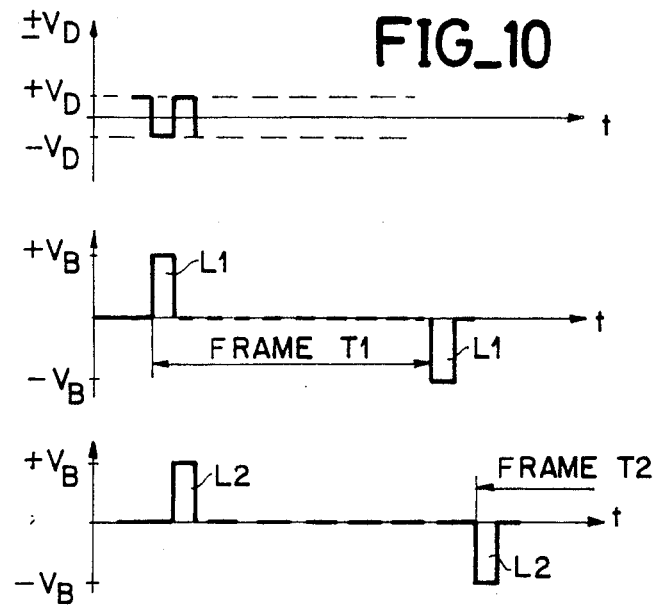

FIG_11
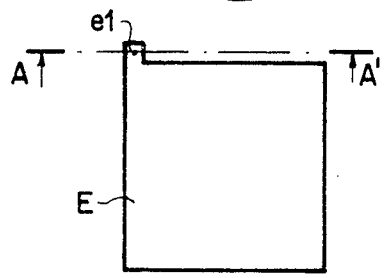
FIG_12
SECTION AA'
FIG_13
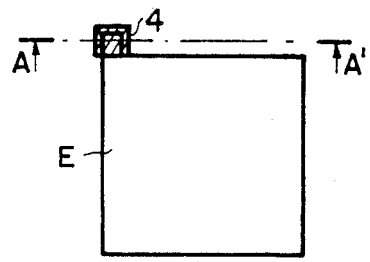
FIG_14
SECTION AA'
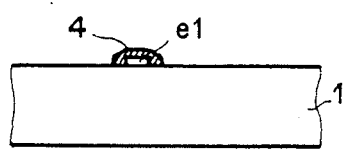
FIG_15
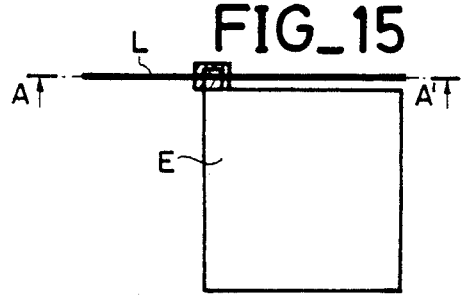
FIG_16
SECTION AA'
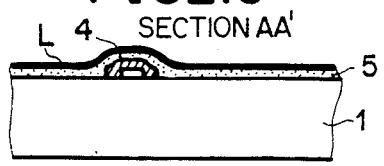
FIG_17
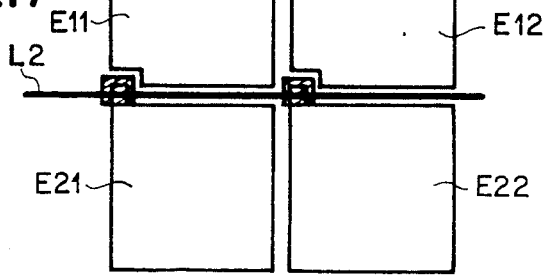

FIG_18
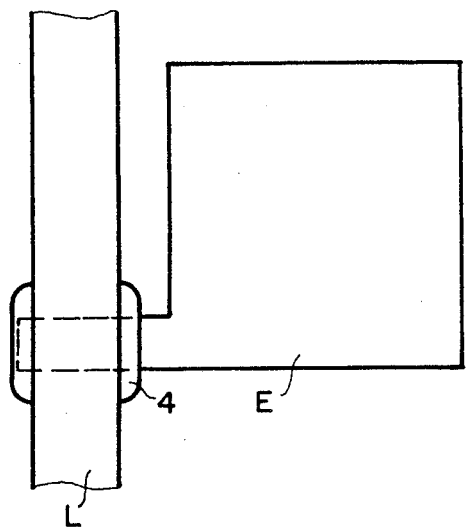
FIG_19
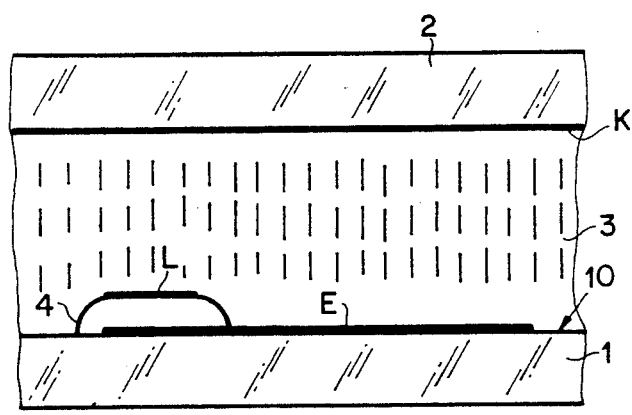

ELECTROOPTICAL DISPLAY SCREEN AND A METHOD OF FABRICATION OF SAID SCREEN

BACKGROUND OF THE INVENTION

1. Field of the Invention

This invention relates to an electrooptical display screen as well as to a method of fabrication of the screen and is more particularly concerned with a matrix-control flat-panel display screen. The invention is applicable to the fabrication of large-area liquid crystal flat-panel screens in which the control points are formed by thin-film integration.

2. Description of the Prior Art

It is already known that display screens usually have a large number of image points or elements of square or rectangular shape. These image elements have to be addressed individually. The definition of the screen is a function of the number of points which are capable of receiving an item of information. Control of each point is performed by application of an electric field through the liquid crystal. For the purpose of visualizing alphanumeric or graphic data, it has been proposed to provide matrix-type displays. In this design, each image element is defined by the intersection of two orthogonal arrays of leads designated as rows and columns.

Addressing of matrix-type display screens assumes steadily greater importance as it is sought to attain higher levels of definition or in other words to increase the number of elementary image points.

Since the elementary points are addressed sequentially line by line, the number of addressable lines is usually limited by the characteristics of the electrooptical effect of the liquid crystal employed. The possibility of addressing a large number of lines (>100) is accordingly carried into effect at the expense of the other characteristics of the screen (reduction in contrast and increase in angular dependence).

In order to improve the performances of these screens, it is possible to mount in series with each image element a nonlinear element whose electrical impedance varies:

either as a function of the voltage applied to its terminals by making use of a device such as a zinc oxide varistor as described in the article by A. C. Castleberry et al. published in SID 1980 Technical Digest or else by making use of a MIM element as described in the article by K. Niwa et al. published in SID 1984 Technical Digest or else by employing head-to-tail diodes as described in the article by N. Szydlo et al. published in Japan Display 83 Technical Digest;

or as a function of a control voltage by employing thin-film transistors as described in the article by T. P. Brody et al. published in IEEE Electron Devices ED 20 995 (1973).

In the field of display screens, current technical requirements are concerned with the achievement of optimum image definition. In the case of screens of the matrix display type, it is accordingly found necessary to design devices having a large number of addressing rows or columns which can amount to as many as 1024 or even more. This entails a corresponding increase in the number of control elements. For purposes of large-scale manufacture, it is necessary in particular to obtain high production efficiency, good reproducibility and high stability of these components. Moreover, the electrical characteristics of the component must necessarily be matched with those of the associated cell, also with good reproducibility.

SUMMARY OF THE INVENTION

The present invention relates to a display screen which is easier to construct, thus making it possible to produce large-area screens.

More specifically, the invention relates to an electrooptical display screen comprising:

first and second parallel plates which tightly enclose electrooptical material;

the first plate being provided on that face which is in contact with the electrooptical material with a matrix array of electrodes arranged in rows and columns, row control leads each associated with one row of electrodes of said matrix array and extending in a direction parallel to each row of electrodes;

the second plate being provided on that face which is in contact with the electrooptical material with column leads each corresponding to one column of the matrix array of electrodes of the face of the first plate.

The distinctive feature of the display screen lies in the fact that each row control lead is electrically coupled to the electrodes with which it is associated by means of coupling elements of ferroelectric material.

The invention also relates to a method of fabrication of an electrooptical display screen which essentially involves the following steps:

a first step of formation of electrodes of conductive material on a substrate;

a second step of formation of a layer of ferroelectric material on all the electrodes;

a third step of etching of the layer of ferroelectric material in order to obtain at least one element of said ferroelectric material on each electrode;

a fourth step of formation of a layer of conductive material;

a fifth step of etch-cutting of at least one row control lead in the layer of conductive material deposited during the fourth step, said row control lead being intended to cover at least one element of ferroelectric material and a portion of electrode located beneath said element of ferroelectric material.

BRIEF DESCRIPTION OF THE DRAWINGS

FIG. 1 illustrates one example of construction of a portion of display screen in accordance with the invention.

FIG. 2 is a top view showing the portion of screen of FIG. 1.

FIG. 3 is a diagram representing a hysteresis loop of a ferroelectric material.

FIGS. 4 to 8 are electrical diagrams of operation of the portion of screen of FIG. 1.

FIG. 9 is an equivalent electrical diagram of a display screen in accordance with the invention.

FIG. 10 is a time-waveform diagram illustrating the operation of a display screen in accordance with the invention.

FIGS. 11 to 17 illustrate different stages of a method of fabrication in accordance with the invention.

FIGS. 18 and 19 illustrate one example of construction of an alternative embodiment of a portion of display screen in accordance with the invention.

DETAILED DESCRIPTION OF THE INVENTION

This invention relates to an electrooptical display screen in which an element of ferroelectric material is placed in series with each image element.

Within a given temperature range, a ferromagnetic substance has nonzero spontaneous electric polarization P when no electric field is applied to the material.

This spontaneous polarization is due to macroscopic orientation of the elementary dipoles of the material. The term Seignette-electrics is also widely used to designate ferroelectrics and is derived from the first substance found to have these properties, Seignette salt.

Ferroelectrics are characterized by the hysteresis loop which exists between the applied electric field E and the polarization P (as shown in FIG. 3). The principal parameters of these loops are as follows:

Pr or $-P_r$=remanent polarization in the material when no electric field is applied;

Ec or $-Ec$=coercive field which is the electric field to be applied in order to cancel the remanent polarization $P_r$ which existed within the material.

In the case of an oscillation of the electric field between two values $\pm Em$, periodic reversal of the dipoles of the material is obtained.

Ferroelectrics can be either inorganic crystals such as Seignette salt $B_aTiO_3$ or $KPO_4H_2$ or polymers such as polyvinylidene difluoride (PVDF) or copolymers of polyvinylidene difluoride—trifluoroethylene P(VDF.T,F).

In the example of fabrication in accordance with the invention, ferroelectric polymers for controlling a liquid crystal can be used on large surface areas with a small thickness and therefore with low control voltages which are compatible with the liquid crystal.

FIGS. 1 and 2 represent one example of fabrication in accordance with the invention and illustrate a control element of a liquid-crystal screen.

In FIG. 1, there are shown two parallel plates 1 and 2 which tightly enclose electrooptical material such as a liquid crystal 3. Should the screen operate in the transmission mode, both plates are of transparent material such as glass. If the screen operates in the reflection mode, however, at least one of the plates such as the plate 2, for example, is transparent.

Column electrodes such as the electrode K are disposed on that face of the plate 2 which is in contact with the liquid crystal 3.

On the face 10 of the plate 1 which is in contact with the liquid crystal 3 are disposed electrodes E each corresponding to one picture element (or pixel). These electrodes E are associated with row control leads such as the lead L.

In accordance with the invention, coupling of an electrode E and of a lead is achieved by means of an element 4 of ferroelectric material. This element 4 is coated with a layer 5 of insulating material in order to isolate said element from the liquid crystal 3. However, this is not an essential requirement if the insulator is not attacked by the liquid crystal. In this case, provision will be made for an alternative form of construction as shown in FIGS. 18 and 19 in which the same references designate the same elements as in FIGS. 1 and 2 and in which the element 4 of ferroelectric material directly connects the lead L to the electrode E.

Control of a picture element will therefore be carried out by applying a voltage between a column electrode K and a row electrode L. The electric control circuit will therefore comprise in series: the column electrode K, the liquid crystal 3, the electrode E, the ferroelectric material 4, an insulating thin film 5, the row lead L.

FIG. 4 is a schematic circuit diagram of a picture element of the display screen considered in this specification.

At the intersection of a row and a column, there are present in series the ferroelectric material as represented by its capacitance Cf and having the hysteresis loop recalled in FIG. 5, and the electrooptical material (liquid crystal, for example) as represented by its capacitance $C_{XL}$ and its resistance $R_{XL}$.

The general principle of operation of a screen of this type consists in employing the ferroelectric material as an electrically controllable source of electric charge.

In fact, when a voltage V is applied to the ferroelectric material at the terminals of the array, this voltage being such that V>Vm and of opposite direction with respect to the initial direction of the dipoles, these latter undergo a reversal and give rise to a variation in electric charge Q=2PrSf (Sf=area of capacitance Cf) for cancelling the electric field induced by said dipoles. If the dipoles are oriented in the ferroelectric material in the manner shown in FIG. 6, a dipole reversal is obtained as shown in FIG. 7.

This charge also appears on the liquid crystal and induces a voltage on this latter as follows:

$$V_{XL} = \frac{2P_rS_f}{C_{XL}}$$

This voltage, however, may be insufficient to produce switching of the liquid crystal, as shown in FIG. 3.

These charges stored in the liquid crystal are subsequently discharged through the resistance $R_{XL}$ within a characteristic time interval $t=R_{XL} C_{XL}$ on condition that the characteristic time of discharge of the ferroelectric element is of high value in comparison with the frame period (which is usually the case).

It is therefore true to state that ferroelectric material provides an electrically controllable current supply. In fact, if a voltage $V<V_m$ is applied to ferromagnetic material, dipole reversal will not take place, the charge $Q_c=2p_rS_f$ will not appear and the voltages developed on the liquid crystal will be of low value.

FIG. 9 is an equivalent circuit diagram of a display screen in accordance with the invention. The different image cells of the display screen are arranged in a row-and-column matrix and are controlled by row leads L1, L2 and column leads K1, K2. One image cell is placed at each point of intersection of a row lead and column lead. Each image cell has been represented in the form of its equivalent circuit diagram as explained earlier with reference to FIGS. 1 to 8.

The row leads are addressed by an addressing circuit 7 ADD.L which makes it possible to connect a voltage source VL to any one of the row leads L1, L2.

The column leads are addressed by an addressing circuit ADD.K which permits connection of a voltage source VK to the entire set of column leads K1, K2.

The circuit ADD.L makes it possible to apply during a given frame period a potential $+V_B$ or $-V_B$ or so-called sweep voltage to a row lead to be addressed. The other row leads are maintained at zero potential. The values $+V_c$ and $-V_c$ indicated in FIG. 5 will be given to the potentials $+V_B$ and $-V_B$.

Moreover, these circuits serve to apply to the column leads a voltage within the range of $+V_D$ to $-V_D$ along the column lead for exciting or not exciting the crossover points located at the intersection of the addressed-row lead and the different column leads. The absolute value chosen for the voltage $V_D$ will be the value $\Delta V/2$ indicated in FIG. 5.

During a given frame period T1, as shown in FIG. 10, the voltage $+V_B$ is applied successively to all the rows of the screen. During each pulse applied to one row (L1, L2, . . . ), the column leads receive a potential within the range of $+V_D$ to $-V_D$ depending on the nature of the information to be applied to each point of intersection of rows and columns.

By choosing Cf $C_{XL}$ and Rf Rxl (which is always possible if the area of capacitance of the ferroelectric material with respect to the liquid crystal area is reduced), the voltages $V_B+V_D$, $V_B-V_D$, $\pm V_D$ will be wholly transferred to the ferroelectric.

In particular, during the addressing interval $$V_B + V_D = V_c + \frac{\Delta V}{2}$$

will be wholly transferred to the ferroelectric which will be switched and the following voltage $$v = \frac{2P_r S_f}{C_{XL}}$$

will accordingly appear on the liquid crystal.

So far as concerns the voltage $$V_B - V_D = V_c - \frac{\Delta V}{2},$$

this voltage will not have the effect of switching the ferroelectric and no voltage will appear on the liquid crystal.

During the remainder of the frame period, the voltages $\pm V_D$ which are applied to the complete assembly consisting of liquid crystal and ferroelectric material will be applied almost entirely to the ferroelectric material by reason of the capacitance ratio Cf/Cc.

During one frame period, the voltage at a nonexcited point will therefore be practically zero whilst the voltage at an excited point will be as follows:

$$V = \frac{2P_r S_f}{C_{XL}}$$

During the addressing interval, this voltage is discharged with a characteristic time interval $= R_{XL}\, C_{XL}$.

During the following frame period T2, the addressing voltages are reversed as shown in FIG. 10. Thus the row L1 which had been addressed at a potential $+V_B$ during a first frame period T1 is addressed by a potential $-V_B$ during the following frame period T2. The voltages $+V_D$ and $-V_D$ applied to the column leads are also reversed in respect of one and the same displayed item of information.

Furthermore, the above-mentioned voltage reversal makes it possible to apply a zero-average voltage to the liquid crystal, thus inhibiting the effects of electrochemical degradation of the liquid crystal.

By way of example, the invention can be carried out with the numerical values given below.

Postulating that Sf = 100 $\mu m^2$, ef = 1 $\mu m$
and Sxl = $10^5$ $\mu m^2$ and $e_{XL}$ = 10 $\mu m$ which corresponds to a screen pitch of approximately 350 $\mu m$, we have:

$$\frac{C_f}{C_{XL}} \quad \frac{1}{100} \quad \frac{S_f}{S_{xc}} = \frac{1}{1000}$$

The voltage induced by dipole reversal therefore has the value:

$$v = \frac{2P_r S_f}{C_e} = \frac{2P_r e_f}{f_0} \times \frac{C_f}{C_{xc}} = 20 \text{ volts}$$

which, in the case of a characteristic time interval of the liquid crystal of 10 ms and a frame period of 20 ms, corresponds to an average voltage of approximately 5 volts on the liquid crystal.

Taking into account the coercive fields in the ferroelectric material (50 MV/m) when a copolymer P(VDF.TrF) is employed, the addressing voltages $V_B$ and $V_D$ must be equal to:

$V_B = V_c = 50$ volts $V_D = 10$ volts.

In this case, the average voltage applied to the liquid crystal as a result of the capacitance-to-volume ratio will be of the order of 0.1 volt:

$$\left( \frac{C_f}{C_{xL}} \times V_D \right)$$

that is, nearly fifty times smaller than the voltage introduced by reversal of the dipoles.

The foregoing example clearly does not imply any limitation. In particular, it will be possible to adjust the surface area of the ferroelectric and of the liquid crystal so as to ensure that the parameters correspond to the electrooptical effect utilized in the liquid crystal.

Reference being made to FIGS. 11 to 17, there will now be described one example of a method of fabrication in accordance with the invention and in respect of an electrooptical display screen as described in the foregoing.

During a first step, there is deposited on a substrate such as a glass plate 1 a thin film of conductive material which is either transparent or reflecting, depending on whether the screen is intended to operate in the transmission mode or in the reflection mode. Electrodes E or image elements are then etched in said thin film by means of a suitable method such as photolithography, for example. Each electrode E is provided with a raised tooth structure el as shown in FIGS. 11 and 12.

In a second step, a layer of ferroelectric material is deposited on all the electrodes E. This deposition is performed for example under the action of high centrifugal force in order to obtain a thin film-layer of uniform thickness. The thickness of this layer will be 1 micrometer, for example. As mentioned earlier, the material will consist, for example, either of a polymer (such as PVDF) or of a copolymer such as P(VDF.TrF). The coercive field of the copolymer is of the order of 50MV/m and the spontaneous polarization is of the order of P = 0.1 mC/m².

A third step consists in etching the previously deposited layer of ferroelectric material in order to obtain elements 4 of ferroelectric material which cover each raised tooth structure el of the electrodes E. This etching operation may be carried out by means of the plasma-etching process, for example. A structure as illustrated in FIGS. 13 and 14 is thus obtained.

A fourth step consists in forming a layer of insulating material with a view to isolating the ferroelectric material from the electric material which is to be controlled by the electrode E.

By way of example, the insulating material can be silicon nitride ($Si_3N_4$) and the deposition may accordingly be performed by plasma-assisted vapor-phase deposition (CVD) of silicon in the presence of nitrogen.

The insulating material can also be a PVA polymer (polyvinyl alcohol).

The next operation consists in etching the layer of insulating material by plasma or chemical etching process in order to retain only the layer 5 of insulator which is strictly necessary for covering each element 4 of ferroelectric material. However, this etching operation is not essential and the insulating layer may accordingly serve as an anchoring layer for the liquid crystal.

During a fifth step, a layer of conductive material is formed and can consist of vacuum-deposited aluminum, for example.

In a sixth step, the layer of conductive material which has just been deposited is cut by etching so as to form column control leads K which cover one or a number of elements 5 and ferroelectric elements 4 as well as the raised tooth structures el of the electrodes E which are located beneath the elements 5.

A structure as shown in FIGS. 15 and 16 is thus obtained. In the cross-section of FIG. 16 (section A-A'), the element 5 of insulating material covers not only the element 4 of ferroelectric material but also a large part of the surface of the substrate 1. However, this is not an essential requirement. It is only necessary to ensure that the insulating material entirely covers the ferro-electric element 4 in order to avoid any subsequent contact between this latter and the electrooptical material. In fact, in the event that the electrooptical material is a liquid crystal, this latter could produce chemical action on the ferroelectric material. This latter is thus liable to be dissolved by the liquid crystal and to loose its electrical properties.

As applied to the fabrication of a liquid crystal screen, the method in accordance with the invention makes it possible to obtain a configuration as shown in FIG. 17.

At this stage, the construction of the screen reverts to the technology of liquid crystal cells:

a layer of ITO (indium-tin oxide) is formed by etching on the back plate (second glass plate 2) and constitutes the rows of the matrix array;

a molecule-orientation layer (rubbed polymer of evaporated SiO) is deposited on both plates.

Thus, by utilizing the association of a ferroelectric polymer and a liquid crystal in a display screen of the matrix type, the invention makes it possible to apply to the liquid crystal a voltage which is independent of the column-addressing voltage.

This screen is of much more simple design than display panels having thin-film transistor arrays and makes use of a control element which permits the formation of deposits on large surface areas.

It is worthy of note that the forms of construction and numerical examples have been given in the foregoing solely by way of example and for the sake of explanatory illustration. Accordingly, other alternative designs and numerical values may lead to practical arrangements which would not constitute any departure either from the scope or the spirit of the invention.

We claim:

1. An electrooptical display screen comprising:

first and second parallel plates which tightly enclose electrooptical material;

the first plate being provided on that face which is in contact with the electrooptical material with a matrix array of electrodes arranged in rows and columns each electrode forming a pixel of said display, row control leads each associated with one row of electrodes of said matrix array and extending in a direction parallel to each row of electrodes;

the second plate being provided on that face which is in contact with the electrooptical material with column leads each corresponding to one column of the matrix array of electrodes of the face of the first plate so that each electrode is located at an intersection of a row control lead and a column lead; and a plurality of coupling elements of ferroelectric polymer material, with one element being placed at the intersection of each electrode and its associated row control lead and lying therebetween so as to electrically couple the electrode and the row control lead, each element being covered with a thin film of insulating material.

2. An electrooptical display screen according to claim 1, the polymer material being of vinylidene polymer.

3. An electrooptical display screen according to claim 1, the polymer material being a copolymer P(VDF.TrF).

4. An electrooptical display screen according to claim 1, said electrooptical material being a liquid crystal.

5. An electrooptical display screen according to claim 1 and comprising electrical means for selectively applying between a predetermined row lead and a predetermined column lead a potential difference of greater magnitude than the coercive voltage of the assembly consisting of ferroelectric element and liquid crystal located between said electrode and said column lead, said potential difference being of greater magnitude than said coercive voltage, the difference value being such as to exceed a value of voltage which determines a remanent polarization in the ferroelectric element.

6. An electrooptical display screen according to claim 5, said electrical means being provided for selectively applying to the row leads a potential difference equal to said coercive voltage while also selectively applying said difference value to the column leads.

7. An electrooptical display screen according to claim 6, said electrical being provided for selectively applying to the column leads a potential difference equal to said coercive voltage while also selectively applying said difference value to the row leads.

8. An electrooptical display screen according to claim 5 and having a succession of display intervals, said electrical means being provided for reversing the direction of application of said potential difference from one display interval to the next.

9. An electrooptical display screen according to claim 8, said electrical means being provided for reversing the applied voltages from one row to the next.

10. An electrooptical display screen according to claim 1, wherein the layer of insulating material also covers the entire plate with the electrodes and the row leads.

* * * * *